United States Patent [19]

Kawamura

[11] Patent Number: 5,005,539

[45] Date of Patent: Apr. 9, 1991

[54] ENGINE CYCLE CONTROL SYSTEM

[75] Inventor: Hideo Kawamura, Samukawa, Japan

[73] Assignee: Isuzu Ceramics Research Institute Co., Ltd., Kanagawa, Japan

[21] Appl. No.: 522,320

[22] Filed: May 11, 1990

[30] Foreign Application Priority Data

May 11, 1989 [JP] Japan .................................. 1-118474

[51] Int. Cl.$^5$ .............................................. F02B 69/06
[52] U.S. Cl. ................................... 123/21; 123/90.11; 123/DIG. 7
[58] Field of Search ........... 123/21, 64, 90.11, DIG. 7

[56] References Cited

U.S. PATENT DOCUMENTS

| 2,304,407 | 12/1942 | Hogan | 123/21 |
|---|---|---|---|
| 4,353,334 | 10/1982 | Neitz | 123/21 |
| 4,392,459 | 7/1983 | Chareire | 123/90.11 |
| 4,641,613 | 2/1987 | Delesalle | 123/90.11 |
| 4,664,070 | 5/1987 | Meistrick et al. | 123/21 |
| 4,907,544 | 3/1990 | Burrahm | 123/DIG. 7 |

FOREIGN PATENT DOCUMENTS 2219346 12/1989 United Kingdom .................. 123/21

Primary Examiner—David A. Okonsky
Assistant Examiner—Weilun Lo
Attorney, Agent, or Firm—Staas & Halsey

[57] ABSTRACT

An engine cycle control system controls an engine so that it operates in a two-cycle mode when the rotational speed of the engine is lower than a predetermined speed and in a four-cycle mode when the rotational speed of the engine is higher than the predetermined speed. The engine controlled by the engine cycle control system has intake ports defined in a lower circumferential surface of a cylinder, an exhaust port defined in an upper portion of the cylinder and openable and closable at variable timing, and a fuel injection valve for injecting fuel into the cylinder at variable timing and in a variable quantity. Depending on the rotational speed of the engine, the timing of operation of an exhaust valve is varied to select the two-cycle mode or the four-cycle mode. The engine is associated with a turbocharger combined with an electric motor. In a large-load range in the two-cycle mode, the electric motor is energized to assist in turbocharging operation for thereby increasing the torque produced by the engine.

3 Claims, 4 Drawing Sheets

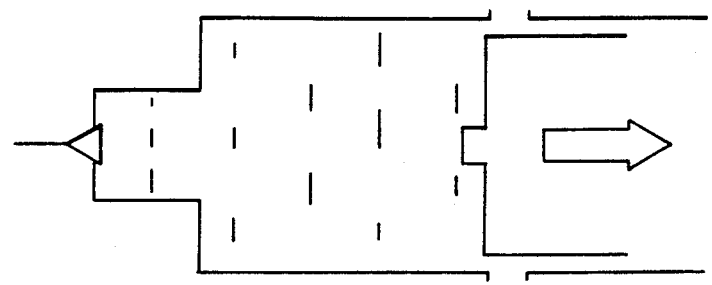
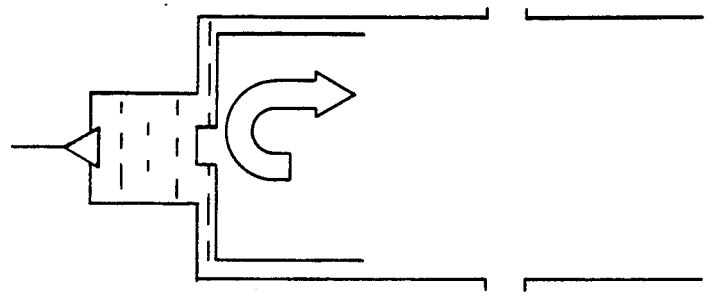
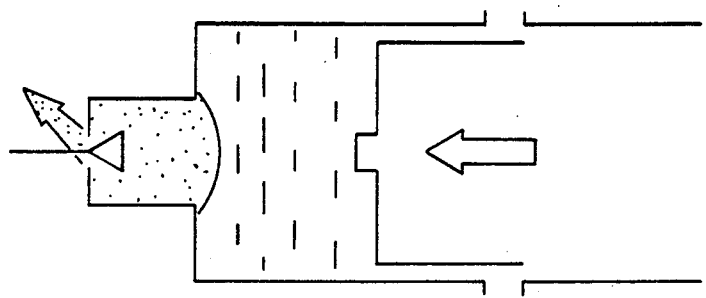
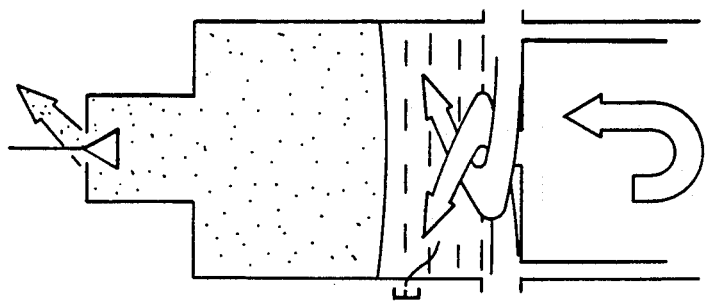
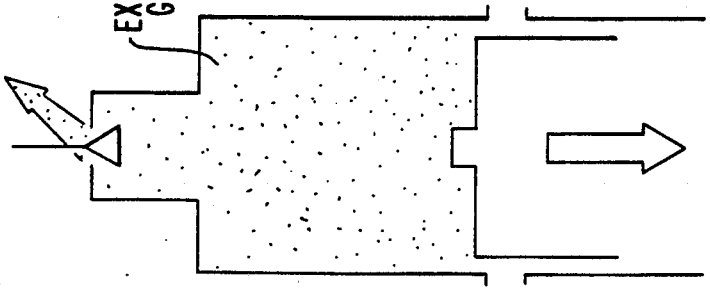

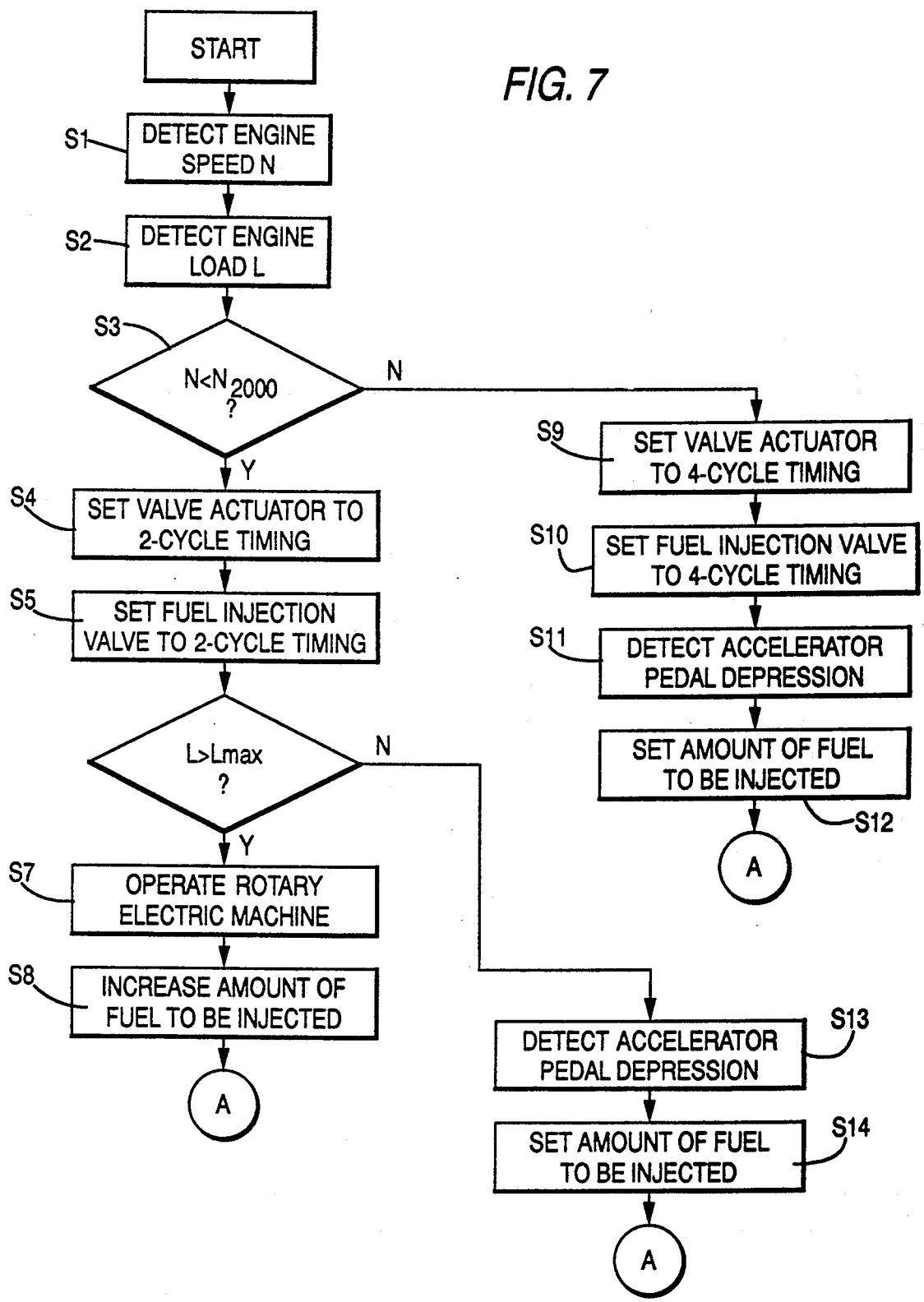

ENGINE CYCLE CONTROL SYSTEM

BACKGROUND OF THE INVENTION

1. Field of the Invention:

The present invention relates to an engine cycle control system for controlling an engine so that it operates in a two-cycle mode when the rotational speed of the engine is lower than a predetermined speed and in a four-cycle mode when the rotational speed of the engine is higher than the predetermined speed.

2. Description of the Prior Art:

Conventional engines are roughly grouped into two-cycle and four-cycle engines in view of different strokes per revolution of the output shaft of the engines.

In the two-cycle engines, since the explosion occurs each time the engine output shaft makes one revolution, the rotational speed of the output shaft suffers less fluctuations, and the engine can produce a high-torque output. However, since the intake and exhaust strokes are simultaneously performed in the two-cycle engines, the intake air and the exhaust gases are not fully exchanged particularly, and the two-cycle engines are lower in efficiency and higher in fuel consumption.

In the four-cycle engines, the explosion occurs each time the engine output shaft makes two revolutions, and the exhaust and intake strokes are independent of each other. Accordingly, the fuel consumption of the four-cycle engines is low. Since, however, the four-cycle engines suffer larger fluctuations in the rotational speed of the engine output shaft, the engine output torque is lower, and the engines do not operate smoothly in a low engine speed range.

SUMMARY OF THE INVENTION

In view of the aforesaid problems of the existing engines, it is an object of the present invention to provide an engine cycle control system for controlling an engine so that it operates as a two-cycle engine in an engine speed range lower than a predetermined speed, i.e., a lower engine speed range, and as a four-cycle engine in an engine speed range higher than the predetermined speed, i.e., a higher engine speed range.

To achieve the above object, there is provided in accordance with the present invention an engine cycle control system an engine cycle control system for controlling an engine so a to be selectively operable in different cycle modes depending on the rotational speed thereof, comprising a cylinder, a piston reciprocally disposed in the cylinder and having a piston head surface, an intake port defined in a circumferential surface of the cylinder and positioned such that the intake port positionally corresponds to the piston head surface when the piston reaches a position near the bottom dead center thereof, an exhaust port defined in an upper portion of the cylinder, an exhaust valve for opening and closing the exhaust port, rotation detecting means for detecting a rotational speed of the engine, load detecting means for detecting a load on the engine, valve actuator means for actuating the exhaust valve to open and close the exhaust port, supercharging means for supplying intake air under pressure through the intake port into the cylinder, supercharging assisting means for assisting in supercharging operation of the supercharging means, a fuel injection nozzle disposed in the upper portion of the cylinder and operable by a control signal for injecting fuel into the cylinder at a prescribed timing, cycle mode selecting means for controlling the valve actuator means to operate the exhaust valve each time the engine makes one revolution and also controlling the fuel injection nozzle to eject fuel each time the engine makes one revolution, thereby operating the engine in a two-cycle mode, when the rotational speed of the engine detected by the rotation detecting means is lower than a predetermined speed, and for controlling the valve actuator means to operate the exhaust valve each time the engine makes two revolutions and also controlling the fuel injection nozzle to eject fuel each time the engine makes two revolutions, thereby operating the engine in a four-cycle mode, when the rotational speed of the engine detected by the rotation detecting means is higher than the predetermined speed, and supercharging control means for operating the supercharging assisting means when the load on the engine detected by the load detecting means is greater than a predetermined load while the engine is being operated in the two-cycle mode by the cycle mode selecting means.

The engine cycle control system controls a variable-cycle engine which can operate as either a two-cycle engine or a four-cycle engine. When the rotational speed of the engine is in a certain speed range lower than a predetermined speed, the engine cycle control system controls the engine to operate as a two-cycle engine. When the rotational speed of the engine is in a certain speed range higher than the predetermined speed, the engine cycle control system controls the engine to operate as a four-cycle engine. Therefore, in a low/medium speed range, the engine can operate as a high-torque engine with smooth engine rotation, and in a medium/high speed range, the engine operates as a high-efficiency engine with low fuel consumption.

If the variable-cycle engine operates as a power unit for motor vehicles, then the number of gear positions of a transmission combined with the engine may be reduced or eliminated.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIGS. 6a–e are diagrams showing certain strokes of the four-cycle engine; and

FIG. 7 is a flowchart of a control sequence of the engine cycle control system according to the present invention.

DETAILED DESCRIPTION OF THE PREFERRED EMBODIMENT

Figure 1:
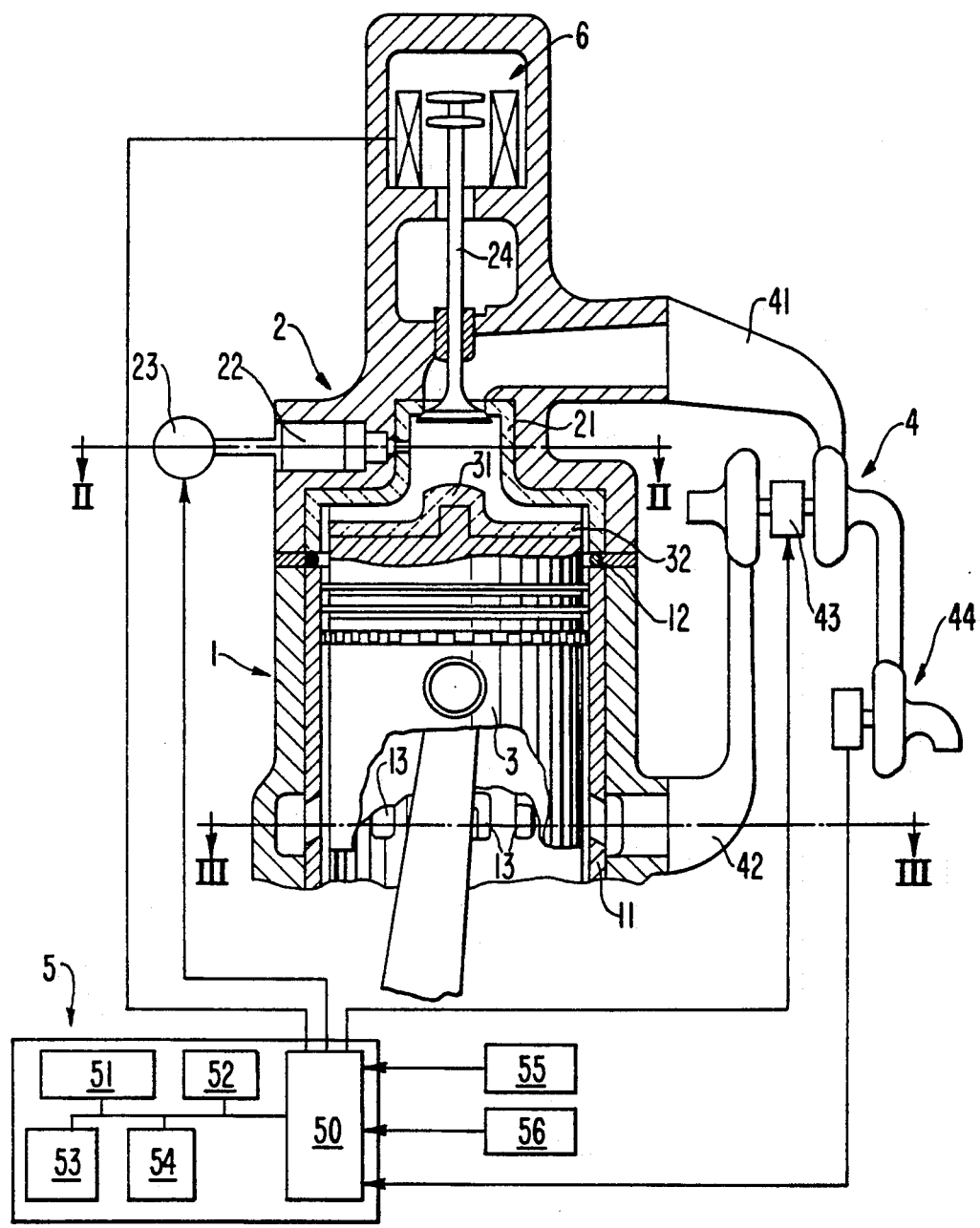
FIG. 1 is a cross-sectional view, partly in block form, of an engine cycle control system according to an embodiment of the present invention.

An engine cycle control system according to an embodiment of the present invention will be described with reference to FIGS. 1 through 3.

A cylinder sleeve 11 is fitted against the inner wall of a cylinder 1. A piston 3 is reciprocally fitted in the cylinder 1. The cylinder sleeve 11 has a circumferential array of intake ports 13 defined in its peripheral wall. The intake ports 13 are positioned such that they are near the upper end of a piston head of the piston 3 when the piston 3 reaches the bottom dead center. The intake ports 13 are inclined with respect to the central axis of the cylinder 1 for introducing swirling intake air into the cylinder 1.

The engine has a prechamber 2 defined centrally in a portion above the cylinder 1 and having an inner wall covered with a sleeve 21 which is made of a heat-resistant heat insulating material such as ceramic. The sleeve 21 and the cylinder sleeve 11 are connected to each other through a heat insulating gasket 12.

Figure 2:
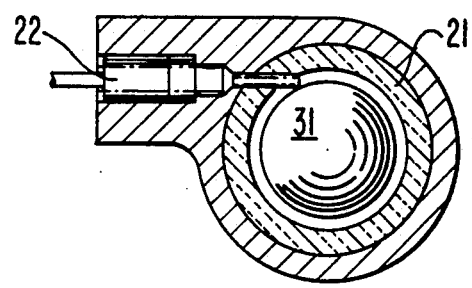
FIG. 2 is a cross-sectional view taken along line II—II of FIG. 1.
Figure 3:
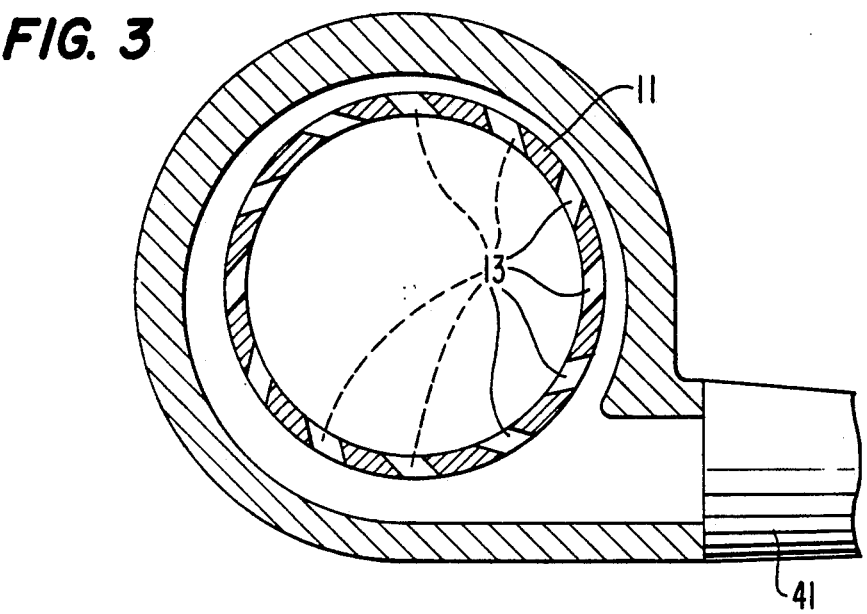
FIG. 3 is a cross-sectional view taken along line III—III of FIG. 1.

An injection nozzle 22 is disposed laterally of the prechamber 2, for injecting fuel into the prechamber 2 along swirls in the prechamber 2 (see FIG. 2). The injection nozzle 22 is connected to a fuel pump 23 by which the timing to inject fuel and the amount of fuel to be injected can be varied. The prechamber 2 has an exhaust port for discharging exhaust gases through the prechamber 2. The exhaust port can be opened and closed by an exhaust valve 24, which is axially movable by a valve actuator 6 disposed around the shank of the exhaust valve 24.

The piston head surface of the piston 3 disposed in the cylinder 1 is covered with a heat-resistant heat insulating material such as ceramic, as with the prechamber 2. The piston 3 has a projection 31 extending from the center of the piston head toward the prechamber 2. When the piston 3 reaches a position near the top dead center of its stroke, the projection 31 narrows the opening of the prechamber 2.

Exhaust gases discharged from the exhaust port are led through an exhaust pipe 41 to the turbine of a turbocharger 4. The turbocharger 4 has a rotatable shaft to which a rotary electric machine 43 is connected. When the rotary electric machine is energized by electric power supplied from an external power supply, it can develop a boost pressure.

The exhaust gases which have gone past the turbocharger 4 are led to a recovery turbine 44 by which remaining heat energy of the exhaust gases is converted into electric energy which is recovered by a control unit 5.

The compressor of the turbocharger 4 can be rotated by the energy of the exhaust gases applied to the turbine or the electric energy supplied to the rotary electric machine, for supplying intake air under boost pressure through an intake pipe 42 to the intake ports 13.

The valve actuator 6, the fuel pump 23, and the rotary electric machine 43 are controlled by signals supplied from an input/output interface 50 of the control unit 5. To the input/output interface 50, there are connected a rotation sensor 55 for detecting the rotational speed and crankshaft angle of the engine, an accelerator pedal movement sensor 56 for detecting the amount of depression of the accelerator pedal associated with the engine, and an electric generator of the recovery turbine 44. Therefore, signals from these sensors and recovered electric energy are applied to the control unit 5.

The control unit 5 comprises, in addition to the input/output interface 50, a ROM 53 for storing a control program and various tables, a CPU 51 for effecting arithmetic operations under the control of the control program stored in the ROM 53, a RAM 54 for temporarily storing the results of the arithmetic operations and data, and a control memory 52 for controlling the flow of signals in the control unit 5.

Figure 4:
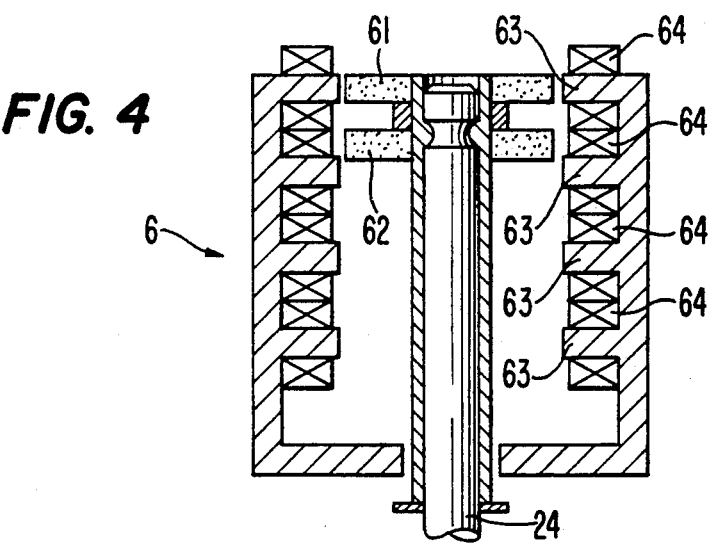
FIG. 4 is a cross-sectional view of a valve actuator.

The valve actuator 6 will be described in detail below with reference to FIG. 4.

Two permanent magnets 61, 62 are fitted over the end of the shank of the exhaust valve 24 in axially spaced relationship. The permanent magnets 61, 62 have respective outer peripheral portions which are magnetized in different polarities. For example, if the outer peripheral portion of the permanent magnet 61 is of N pole, then the outer peripheral portion of the permanent magnet 62 is of S pole.

Magnetic poles 63 are disposed in confronting relation to the permanent magnets 61, 62 and juxtaposed in the direction in which the exhaust valve 24 is movable. The magnetic poles 63 are spaced by intervals different from the interval by which the permanent magnets 61, 62 are spaced from each other. Coils 64 for controlling the polarity of the magnetic poles 63 are wound around the respective magnetic poles 63.

The coils 64 are energized under the control of the control unit 5 such that the polarities of the magnetic poles 63 confronting the permanent magnets 61, 62 are successively varied. The electromagnetic forces thus acting between the permanent magnets 61, 62 and the magnetic poles 63 are combined to move the exhaust valve 24 in opening and closing directions.

A two-cycle mode in which the engine operates as a two-cycle engine will be described below.

When the expansion stroke ends and the piston 3 is positioned near the bottom dead center, intake air supplied under boost pressure from the intake ports 13 flows into the cylinder 1 in which the intake air flows as circumferential air swirls. As the piston 3 moves upwardly, it pushes the exhaust gases upwardly and scavenges the exhaust gases from the exhaust port. On the upward movement of the piston 3, the exhaust port is closed by the exhaust valve 24, and the piston 3 enters the compression stroke in which the intake air is compressed. The continued ascent of the piston 3 accelerates the intake air in the cylinder 1 and forces the intake air into the prechamber 2. In a latter half of the compression stroke, the amount of intake air flowing into the prechamber 2 is reduced, but the speed of intake air swirls into the prechamber 2 is accelerated since the projection 31 on the piston head constricts the opening of the prechamber 2.

When fuel is injected from the injection nozzle 22 into the prechamber 2 along the air swirls therein, the fuel is combusted. The piston 3 now enters the expansion stroke. The injected fuel is fully combusted in the prechamber 2 and the produced exhaust gases lower the piston 3. When the piston 3 is lowered, the opening of the prechamber 2 which has been narrowed by the projection 31 is enlarged, allowing the exhaust gases to be spread quickly into the cylinder 1. On the downward movement of the piston 3, the exhaust valve 24 is actuated to open the exhaust port for thereby discharging the exhaust gases. The above cycle is repeated following the next intake stroke.

Figure 5:
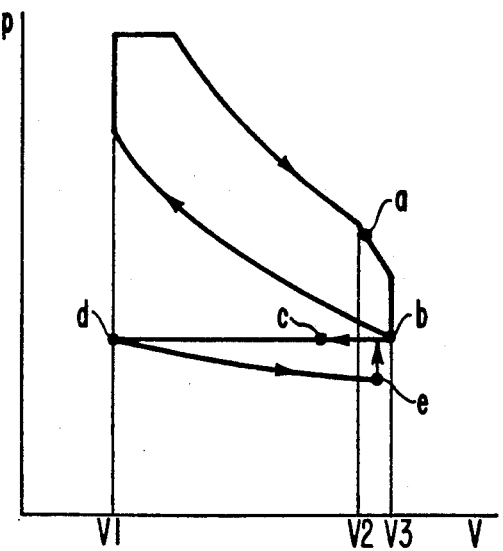
FIG. 5 is a graph showing a pressure vs. volume (p-v) diagram of a four-cycle engine.

A four-cycle mode in which the engine operates as a four-cycle engine will now be described below with reference to FIGS. 5 and 6. Engine conditions at points a through e in FIG. 5 are shown at a through e, respectively, in FIG. 6.

When the volume of the cylinder 1 and the prechamber 2 is increased from a point V1 at the top dead center where the combustion chamber is compressed to a point V2 immediately prior to the bottom dead center, in the expansion stroke after combustion, the exhaust port is opened to start discharging the exhaust gases.

While the volume is expanded through a condition shown at a in FIG. 6 to a point V3 at the bottom dead center, the pressure in the cylinder 1 and the prechamber 2 quickly drops. Since the intake ports 13 are opened at the bottom dead center shown at b in FIG. 6, intake air supplied under boost pressure is introduced as swirling air flows into the cylinder 1.

The introduced intake air pushes the exhaust gases upwardly to assist in discharging the exhaust gases from the exhaust port. The piston 3 moves upwardly from the bottom dead center, closing the intake ports 13 to stop introducing the intake air. Even at this time, exhaust gases still remain in the cylinder 1. Therefore, the exhaust port remains open as indicated at c in FIG. 6. The exhaust port is continuously open until the piston 3 reaches the top dead center, whereupon the exhaust gases are completely discharged from the cylinder.

Then, the exhaust port is closed at the top dead center V1 as indicated at d in FIG. 6. With the exhaust port closed, the piston 3 is lowered to cause the intake air sealed in the cylinder 1 to be adiabatically expanded. Since the temperature of the intake air is lowered during the adiabatic expansion, the intake air quickly absorbs heat energy from the inner wall of the combustion chamber, thus lowering the temperature of the combustion chamber inner wall.

When the piston 3 moves past a point immediately prior to the bottom dead center V3 as indicated at e in FIG. 6, intake air rapidly flows from the intake ports 13 into the cylinder 1 under the boost pressure and a vacuum developed in the cylinder 1. Since the intake ports 13 are inclined with respect to the central axis of the cylinder 1 as shown FIG. 3, the introduced intake air swirls at high speed in the cylinder 1.

As the piston 3 moves upwardly, the swirling air flows in the cylinder 1 are moved into the prechamber 2.

In the latter half of the compression stroke of the piston 3, the amount of intake air flowing into the prechamber 2 is reduced. However, the projection 31 on the piston head enters narrows the opening of the prechamber 2, thereby accelerating the air swirls as they go into the prechamber 2.

Then, fuel is injected from the injection nozzle 22 into the prechamber 2 along the air swirls. The injected is fuel is now ignited and fully combusted, producing exhaust gases which lower the piston 3. When the piston 3 is lowered, the opening of the prechamber 2 which has been narrowed by the projection 31 is enlarged, allowing the exhaust gases to be spread quickly into the cylinder 1. On the downward movement of the piston 3, the exhaust valve 24 is actuated to open the exhaust port for thereby discharging the exhaust gases. The above cycle is repeated following the next intake stroke.

A control sequence of the engine cycle control system for controlling the engine will be described below with reference to FIG. 7.

The rotational speed N of the engine is detected on the basis of the signal from the rotation sensor 55 in a step S1. In a next step S2, the load L on the engine is calculated from the signal from the accelerator pedal movement sensor 56 and the rotational speed N detected in the step S1. Then, a step S3 compares the engine rotational speed N and a predetermined rotational speed, which is 2000 rpm in the embodiment. If the rotational speed N is lower than 2000 rpm, then control goes from the step S3 to a step S4, and if the rotational speed N is higher than 2000 rpm, then control goes from the step S3 to a step S9.

In the step S9, the timing of operation of the valve actuator 6 is set to a four-cycle timing which is stored in the control unit 5. Then, in a step S10, the timing of operation of the fuel pump 23 is also set to a four-cycle timing which is stored in the control unit 5. Thereafter, the amount of depression of the accelerator pedal is detected in a step S11, and the amount of fuel to be injected is set on the basis of the detected accelerator pedal depression in a step S12.

The step S4 and a following step S5 are similar to the steps 9 and 10, except that the timings of operation of the valve actuator 6 and the fuel pump 23 are set to two-cycle timings, respectively.

In a step S6, the engine load L calculated in the step S2 is compared with a maximum load Lmax which corresponds to the engine rotational speed N. If the engine load L is larger than the maximum load Lmax, then electric energy is supplied to the rotary electric machine 43 to operate the latter as a motor in a step S7, thereby increasing the boost pressure. In a next step S8, the amount of fuel to be injected is increased from a preset amount, thereby increasing the engine output power.

If the engine load L is smaller than the maximum load Lmax in the step S6, then control proceeds to a step S13 in which the amount of depression of the accelerator pedal is detected, as with the step S11. Then, the amount of fuel to be injected is set in a step S14.

Although a certain preferred embodiment has been shown and described, it should be understood that many changes and modifications may be made therein without departing from the scope of the appended claims.

What is claimed is:

1. An engine cycle control system for controlling an engine so as to be selectively operable in different cycle modes depending on the rotational speed thereof, comprising:

a cylinder;

a piston reciprocally disposed in said cylinder and having a piston head surface;

an intake port defined in a circumferential surface of said cylinder and positioned such that the intake port positionally corresponds to said piston head surface when said piston reaches a position near the bottom dead center thereof;

an exhaust port defined in an upper portion of said cylinder;

an exhaust valve for opening and closing said exhaust port;

rotation detecting means for detecting a rotational speed of the engine;

load detecting means for detecting a load on the engine;

valve actuator means for actuating said exhaust valve to open and close said exhaust port;

supercharging means for supplying intake air under pressure through said intake port into said cylinder;

supercharging assisting means for assisting in supercharging operation of said supercharging means;

a fuel injection nozzle disposed in the upper portion of said cylinder and operable by a control signal for injecting fuel into said cylinder at a prescribed timing;

cycle mode selecting means for controlling said valve actuator means to operate said exhaust valve each time the engine makes one revolution and also controlling said fuel injection nozzle to eject fuel each time the engine makes one revolution, thereby operating the engine in a two-cycle mode, when the rotational speed of the engine detected by said rotation detecting means is lower than a predetermined speed, and for controlling said valve actuator means to operate said exhaust valve each time the engine makes two revolutions and also controlling said fuel injection nozzle to eject fuel each time the engine makes two revolutions, thereby operating the engine in a four-cycle mode, when the rotational speed of the engine detected by said rotation detecting means is higher than the predetermined speed; and supercharging control means for operating said supercharging assisting means when the load on the engine detected by said load detecting means is greater than a predetermined load while the engine is being operated in the two-cycle mode by said cycle mode selecting means.

2. An engine cycle control system according to claim 1, wherein said supercharging means comprises a turbocharger having a compressor drivable by the energy of exhaust gases discharged from said exhaust port, for supplying intake air under pressure.

3. An engine cycle control system according to claim 2, wherein said supercharging assisting means comprises a rotary electric machine coupled to a rotatable shaft of said turbocharger.

* * * * *

UNITED STATES PATENT AND TRADEMARK OFFICE
CERTIFICATE OF CORRECTION

PATENT NO. : 5,005,539

DATED : April 9, 1991

INVENTOR(S) : Hideo Kawamura

It is certified that error appears in the above-identified patent and that said Letters Patent is hereby corrected as shown below:

Col. 5, line 8, "a" should be --$\underline{a}$--;

line 11, "b" should be --$\underline{b}$--;

line 20, "c" should be --$\underline{c}$--;

line 25, "d" should be --$\underline{d}$--; and line 34, "e" should be --$\underline{e}$--.

Signed and Sealed this

Eighteenth Day of August, 1992

Attest:

DOUGLAS B. COMER

*Attesting Officer*  *Acting Commissioner of Patents and Trademarks*